UNITED STATES PATENT OFFICE 2,325,985

SOFTENER FOR SYNTHETIC RUBBER

Waldo L. Semon, Silver Lake, Ohio, assignor to
The B. F. Goodrich Company, New York, N. Y.,
a corporation of New York No Drawing. Application September 23, 1941,
Serial No. 411,973

8 Claims. (Cl. 260—36)

This invention relates to a new class of softeners for synthetic rubber and to the improved compositions obtainable by the use of such softeners.

In comparison to natural rubber, synthetic rubber is relatively hard, dry and non-tacky and, unlike natural rubber, is incapable of being masticated to a soft plastic condition in which it may readily be compounded and processed. Accordingly, it is necessary to employ softeners or plasticizers in order to improve its processing characteristics. The selection of suitable softeners for synthetic rubber has, however, presented numerous difficulties particularly in the case of synthetic rubber prepared by the copolymerization of a butadiene hydrocarbon and an acrylic nitrile. These difficulties are accentuated by the fact that many softeners ordinarily employed in rubbery or resinous materials are incompatible with this and other types of synthetic rubber and by the further fact that softeners for one type of synthetic rubber do not in all cases function similarly in other types of synthetic rubber. Even varying the proportions of the monomers in the mixtures employed to form copolymers often necessitates the search for new softeners for the synthetic rubber product. Aside from these difficulties some softeners which are compatible with synthetic rubber so adversely affect the properties of vulcanizates prepared from compositions containing them as to preclude their use.

I have now discovered a new class of softeners for any of the synthetic rubbers prepared by the polymerization of a butadiene-1,3 hydrocarbon either alone or in admixture with one or more other polymerizable compounds. These new softeners greatly improve the processing characteristics of unvulcanized synthetic rubber compositions and also enable vulcanizates of excellent physical properties to be produced.

This new class of softeners comprises esters of boric acid with alcohols containing from 4 to 8 carbon atoms. Included in this class are the esters formed from boric acid and monohydric alcohols containing from 4 to 8 carbon atoms such as butyl alcohol, isobutyl alcohol, amyl alcohol, n-hexyl alcohol, 2-ethylhexyl alcohol, benzyl alcohol, phenylethyl alcohol and the like; the esters formed from boric acid and dihydric alcohols or glycols containing from 4 to 8 carbon atoms such as 2-methyl-1,3-propanediol, 2,2-dimethyl-1,3-propanediol, 1,2-butanediol, 1,3-butanediol, 1,4-butanediol, 3-methyl-1,3-butanediol, 2,2-dimethyl-1,4-butanediol, 2,3-pentanediol, 2-methyl-2,5-pentanediol, 2,5-dimethyl-2,5-pentanediol, 1,4-pentanediol, 1,5-pentanediol, 2-methyl-2,4-pentanediol, 2,5-hexanediol, 1,6-hexanediol, 2,2-dimethyl-3,4-hexanediol, 1,2-octanediol, pinacol (2,3-dimethyl-2,3-butanediol) and the like; the esters of boric acid with glycerol and other trihydric alcohols containing from 4 to 8 carbon atoms such as 1,2,3-butanetriol, 1,2,3-pentanetriol and the like and the esters of boric acid with other 4 to 8 carbon atoms polyhydric alcohols such as erythrytol, dulcitol, mannitol and the like. Esters of boric acid with paraffin glycols containing from 4 to 8 carbon atoms as well as the trialkyl and triaralkyl borates wherein the alkyl or aralkyl group contains from 4 to 8 carbon atoms are preferred. For example, tributyl borate, tribenzyl borate and the borate ester of 1,3-butanediol which is believed to have the following structure,

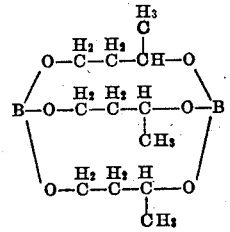

are particularly effective softeners.

As mentioned hereinabove these borate esters may be employed as softeners for any of the synthetic rubbers prepared by the polymerization of a butadiene-1,3 hydrocarbon, by which is meant butadiene-1,3 and its homologs which polymerize in essentially the same manner such as isoprene, 2,3-dimethyl butadiene-1,3 piperylene etc., either alone or in admixture with other butadiene-1,3 hydrocarbons or with other unsaturated monomers copolymerizable therewith. Among such unsaturated monomers copolymerizable with a butadiene-1,3 hydrocarbon to form synthetic rubber there may be mentioned the aryl olefins such as styrene and vinyl naphthalene; the alpha methylene carboxylic acids, and their esters, nitriles and amides such as acrylic acid, methyl acrylate, methyl methacrylate, acrylonitrile, methacrylonitrile, methacrylamide and the like; isobutylene, methyl vinyl ether; methyl vinyl ketones; vinylidene chloride and other unsaturated hydrocarbons, esters, alcohols, acids, ethers, etc., which contain the polymerizable structure

where at least one of the disconnected valences is attached to an electroactive group, that is, a group which substantially increased the electrical dissymmetry or polar character of the molecule. The polymerization to form a synthetic rubber may be accomplished by any of the well known methods, such as homogenous polymerization, polymerization in aqueous emulsion, etc.

The incorporation of the softener with the synthetic rubber may be effected by any desired method as by adding the softener to synthetic rubber while the rubber is being worked on a roll mill, masticating a mixture of the rubber and softener in an internal mixer such as a Banbury type mixer, adding the softener to an emulsion or dispersion of the synthetic rubber or by adding the softener to a solution of the rubber in a solvent.

The amount of the softener added will depend upon the properties desired in the composition and upon the nature of the rubber treated, the rubber and the softener being compatible over a wide range of proportions. In commercial operations it will ordinarily be expedient to employ from about 10 to 50 parts by weight of the softener for each 100 parts of synthetic rubber but amounts smaller or larger than this, ranging for example from 1 to 100 parts of softener for each 100 parts of synthetic rubber, are also effective. With synthetic rubber prepared by the copolymerization of butadiene and styrene or of butadiene and acrylic esters it is possible to use smaller amounts of softener than are required with rubber prepared by the copolymerization of butadiene and acrylic nitrile.

In one example of an embodiment of this invention, a softened synthetic rubber composition is prepared by incorporating on a roll mill 50 parts by weight of 1,3-butanediol borate in 100 parts of a synthetic rubber prepared by the copolymerization in aqueous emulsion of 55 parts by weight of the butadiene and 45 parts by weight of acrylonitrile. The softener adds rapidly to the synthetic rubber to produce a soft plastic composition. The milling and processing characteristics of the batch are greatly improved by the addition of the softener. The tackiness of the composition is also considerably increased. Compounding and vulcanizing ingredients including carbon black, sulfur and a vulcanization accelerator are then added to the softened composition and the composition is vulcanized. A vulcanizate having particularly valuable properties is produced. In addition to possessing good tensile strength and ultimate elongation, the vulcanizate is highly resilient and possesses a very low compression set. The vulcanizate neither swells nor shrinks when immersed in mineral oils or gasoline and it possesses a freezing point lower than that ordinarily obtained with this synthetic rubber.

In another embodiment of the invention only 10 parts by weight of the softener employed above are added to 100 parts by weight of a synthetic rubber prepared by copolymerizing butadiene and styrene. The softener also improves the processing of this synthetic rubber and increases the resilience of vulcanizates.

It is to be understood that the above examples have been given by way of illustration only and are not intended to limit the invention in any respect. Other softeners in this class may be incorporated in other synthetic rubbers prepared by the polymerization of a butadiene hydrocarbon to produce excellent vulcanized and unvulcanized compositions. Other materials such as natural rubber, other softeners, pigments, vulcanizing agents, accelerators, antioxidants and the like may be included in the compositions herein described. Other modifications which will be apparent to those skilled in the art are also within the spirit and scope of the invention as defined by the appended claims.

I claim:

1. A composition of matter comprising a synthetic rubber prepared by the polymerization of a butadiene-1,3 hydrocarbon and, as a softener therefor, an ester of boric acid with an alcohol containing from 4 to 8 carbon atoms.

2. A composition of matter comprising a synthetic rubber prepared by the copolymerization of a butadiene-1,3 hydrocarbon and at least one other unsaturated compound which contains

group and is copolymerizable therewith and, as a softener therefor, an ester of boric acid with an alcohol containing from 4 to 8 carbon atoms.

3. A composition of matter comprising a synthetic rubber prepared by copolymerizing butadiene-1,3 and acrylonitrile and, as a softener therefor, an ester of boric acid with an alcohol containing from 4 to 8 carbon atoms.

4. A composition of matter comprising a synthetic rubber prepared by copolymerizing butadiene-1,3 and styrene and, as a softener therefor, an ester of boric acid with an alcohol containing from 4 to 8 carbon atoms.

5. A composition of matter comprising a synthetic rubber prepared by the copolymerization of a butadiene-1,3 hydrocarbon and at least one other unsaturated compound which contains a

group and is copolymerizable therewith, and, as a softener therefor, an ester of boric acid with a paraffin glycol containing from 4 to 8 carbon atoms.

6. The composition of claim 3 wherein the softener is the boric acid ester of 1,3-butanediol.

7. The composition of claim 4 wherein the softener is the boric acid ester of 1,3-butanediol.

8. A vulcanized synthetic rubber composition obtained by vulcanizing a synthetic rubber prepared by the polymerization of a butadiene-1,3 hydrocarbon in the presence of an ester of boric acid with an alcohol containing from 4 to 8 carbon atoms.

WALDO L. SEMON.